July 25, 1933.    H. FALKENDORF    1,919,692
PROCESS OF MAKING FROZEN CONFECTIONS
Filed July 15, 1929
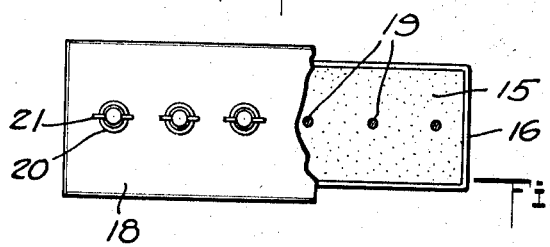
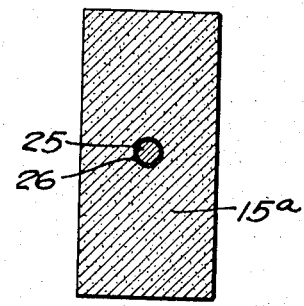
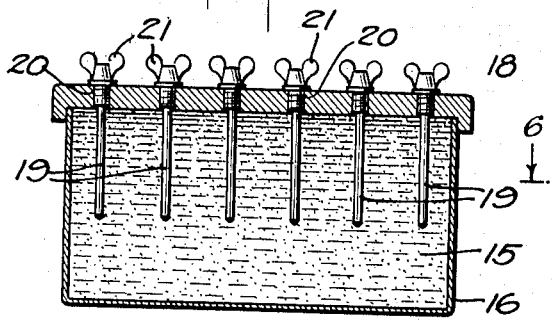
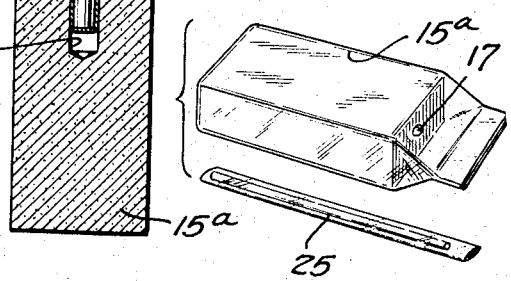
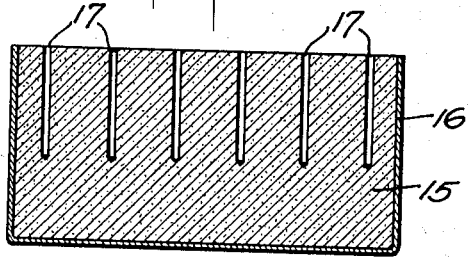
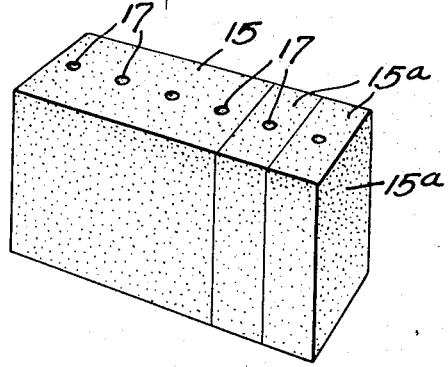
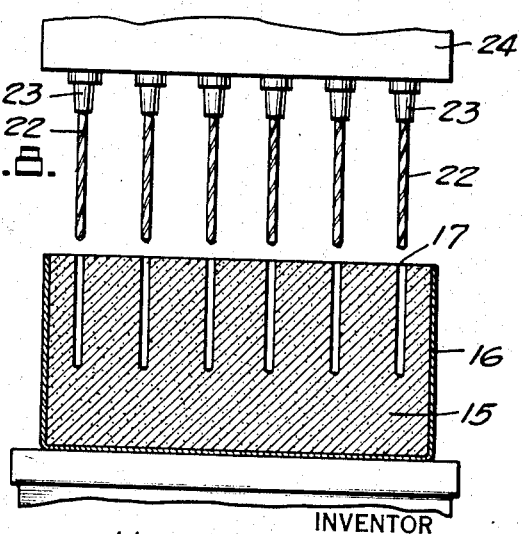
INVENTOR
HENRY FALKENDORF
BY
ATTORNEYS Patented July 25, 1933

1,919,692

UNITED STATES PATENT OFFICE

HENRY FALKENDORF, OF LOS ANGELES, CALIFORNIA

PROCESS OF MAKING FROZEN CONFECTIONS

Application filed July 15, 1929. Serial No. 378,468.

My invention relates to processes for the manufacture of frozen confections, that is to say, confections formed of an edible substance which is soft or fluid at normal temperatures and is hardened by refrigeration.

It is a purpose of my invention to provide a process of making frozen confections which is characterized by the formation in the frozen confection of a pocket or opening for the reception of a handle member or stick by which the confection is adapted to be held while eating, and the coating of at least a portion of the handle member with an adhesive which has the property of forming a bond between the handle member and confection when the member is inserted into the latter, so that in consequence, the confection is securely attached to the handle member to facilitate holding of the confection while eating.

Although the confections and handle members as sold to the trade are wrapped for hygienic and sanitary reasons, they may be wrapped and packed separately and the handle members applied to the confections as sold to the consumer, thus greatly facilitating not only the wrapping but also the packing of the confections, for the difficulties presented by the handle members projecting from the confections in wrapping and packing are avoided.

It is also a purpose of my invention to provide as an article of manufacture, a frozen body composed of an edible substance and provided with a pocket opening therein adapted for the reception of a handle member, and a handle member coated with an edible adhesive for insertion into the pocket whereby, moistening of the edible adhesive is effected to affix the handle member within the frozen body.

I will describe only one process of making frozen confections, and one form of frozen confection as an article of manufacture, each embodying my invention.

For a full understanding of the process and the various steps incident to carrying out the same, as well as the construction of the article, reference is to be had to the following description and accompanying drawing, in which:

Fig. 1 is a view showing in top plan a container and a projection holding member, with a portion of the latter broken away to reveal the showing that the container is filled with a frozen and edible substance.

Fig. 2 is a view showing the container and projection holding member in vertical section, and with the projections carried by the member extending into the frozen substance.

Fig. 3 is a view similar to Fig. 2 showing the projections and holding member removed from the container and revealing the pockets formed in the frozen substance by the projections.

Fig. 4 is a perspective view of the body of frozen substance removed from the container, and illustrating the subsequent step of dividing the body into individual blocks, each of which is provided with one of the pockets.

Fig. 5 is an enlarged view showing one of the individual blocks in vertical section and with the handle member in applied position thereon.

Fig. 6 is a transverse sectional view taken on the line 6—6 of Fig. 5.

Fig. 7 are perspective views showing one individual confection block, and one handle member separately wrapped and ready for use.

Fig. 8 is a view showing the container in vertical section and a gang of drill bits withdrawn from the frozen substance in the container, and illustrating the pockets formed in the substance by means of such bits.

The frozen confections which are to be manufactured by my process essentially consist of a body 15 formed of some edible substance such as flavored ice, ice cream, sherbet, or the like, which is fluid at normal temperatures and is hardened or solidified by refrigeration.

In carrying out my invention, the substance of which the body 15 is formed is placed in a container 16 while fluid and then subjected to a freezing temperature by refrigeration in any manner suitable for the purpose, and by means of which the substance is solidified. Pockets or openings 17 are formed in the body 15 in any one of three ways, although it is to be understood that I do not desire to be limited or restricted to these three ways as others than those herein shown and described may be employed. One method of forming the pockets or openings is to provide a member 18 placed on top of the container 16 and having projections or pins 19 extending from the under side of the member for insertion into the body 15. These projections or pins are in the form of metal rods having relatively pointed lower ends and upper ends formed with heads 20 threaded in the member 18 and provided with handles 21 by which the heads may be readily rotated in the member 18 to feed the pins upwardly. This construction is illustrated in Figs. 1 and 2 and is designed for use in the following manner:

When the substance is fluid of which the body 15 is formed, the projection holding member 18 is applied to the top of the container 16 so that the pins or projections 19 extend into the fluid. By now subjecting the substance to refrigeration it is transformed into a solidified body with the projections embedded in the body. To remove the projections from the body it is only necessary to rotate the heads 20 by means of the handles 21 so as to feed the projections upwardly. This operation loosens the pins so that the member 18 may be lifted to withdraw the projections from the body. With the projections withdrawn the pockets 17 are formed, and it will be understood that by reason of spacing the projections, the pockets formed thereby are correspondingly spaced as is best illustrated in Fig. 4. The second mode of forming the pockets 17 is by first hardening the body 15 by refrigeration and then applying the member 18 with the projections 19 heated to a temperature sufficient to cause rapid melting of the substance by bringing the projections into contact therewith. Thus, by forcing the member 18 downwardly all of the projections may be forced into the solidified body, and the pockets 17 thus formed.

The third method of forming the pockets 17 is by means of the apparatus illustrated in Fig. 8 and which apparatus consists of a gang of uniformly spaced drill bits 22 secured in chucks 23 rotatable in a mounting 24 and positively driven to effect rotation of the bits as will be understood. The mounting 24 is movable vertically to advance or retract the bits in respect to the solidified body 15 in the container 16. By first freezing the substance 15 so that the body is solidified, the mounting 24 may be lowered and the bits simultaneously rotated, thus causing the latter to drill openings in the body 15 and form the pockets 17. The pockets thus formed are spaced as those illustrated in Fig. 4 so that the subsequent step of dividing the body 15 into individual sections or blocks may now be performed and in such manner that each block is provided with one of the pockets.

The dividing step may be performed by cutting or sawing depending upon the nature of the frozen substance, and to form the individual blocks indicated at 15ª, with each block containing a pocket 17.

The individual blocks of frozen confection having been made, the next step in the process resides in the provision of handle members 25 in the form of sticks of wood or any other suitable material and of a diameter to permit insertion thereof into the pockets 17 and in such manner that a portion of each stick projects from the confection to provide a handle adapted to be gripped for holding the confection while eating. The inserted part of the stick is affixed within the confection by employing an adhesive, preferably one which is edible such as gelatin, with which the inserted part is coated as indicated at 26 in Figs. 5 and 6. Each stick is coated with an adhesive in any suitable manner such as by dipping the stick into a mass of fluid gelatin, and although the adhesive will congeal, when the stick is inserted into the frozen confection the moisture on the walls of the pocket 17 will operate to soften the adhesive sufficient to cause it to form a bond between the stick and the confection so that the former is securely retained within the confection to effectively perform the functions for which it is intended. The security with which the edible adhesive binds the confection to the stick prevents the withdrawal of the stick from the confection, and it is important to note that in inserting the coated stick into the confection it will not operate to split the confection.

In practice, the confection blocks are adapted to be wrapped independently and separately from the handle members 25, as illustrated in Fig. 7 and by reason of the fact that the handle member is detached from the confection block, the blocks and handle members may be packed separately and very compactly, because the handle members do not project from the ends of the blocks as is the case where the handle members are frozen into the blocks as in previous processes. The consumer in purchasing one of the confections merely unwraps the confection block and the handle member and inserts the latter ino the pocket 17 of the block where under the action of the adhesive, the confection instantly and securely adheres to the handle member until the last particle of the confection is consumed.

Although I have herein shown and described only one process of making frozen confections, and one form of frozen confection as an article of manufacture, each embodying my invention, it is to be understood that various changes and modifications may be made herein without departing from the spirit of the invention and the spirit and scope of the appended claims.

I claim:

1. A process of making a frozen confection which comprises the formation of a pocket in a frozen body of edible substance, and the insertion into said pocket of a handle member having a gelatin coating thereon to form a bond between the frozen body of edible substance and the handle member to retain the latter within the pocket.

2. A process of making frozen confections which comprises the formation of pockets in a frozen body of edible substance, cutting the frozen body into individual blocks, each of which is provided with one of the pockets, coating handle members with an adhesive, separately and individually wrapping the handle members and frozen bodies, and when about to be consumed unwrapping a frozen body and a handle member and inserting the latter into the former whereby, the adhesive affixes the handle member to the frozen body.

3. A process of affixing a handle member to a frozen confection which consists in coating at least a part of the handle member with gelatin, and inserting the coated part of a handle member into the frozen confection.

4. A process of making a frozen confection which comprises freezing an edible substance which is fluid at normal temperatures to form a solidified body, forcing a plurality of heated projections into the solidified body, withdrawing the projections from the solidified body leaving pockets in the body, and then cutting the solidified body into individual blocks, each of which is provided with one of the pockets.

5. A process of making a frozen confection which comprises freezing an edible substance which is fluid at normal temperatures to form a solidified body, forcing a plurality of heated projections into the solidified body, withdrawing the projections from the solidified body leaving pockets in the body, cutting the solidified body into individual blocks each of which is provided with one of the pockets, coating handle members with an edible adhesive, an inserting one of the handle members into each pocket so that the edible adhesive becomes moistened and forms a bond between the handle and the solidified body to affix the handle member within the body.

6. A process of affixing a handle member to a frozen confection which consists in coating at least a part of the handle member with gelatin, and bringing the handle member into contact with the frozen confection whereby the handle member is attached to the confection.

HENRY FALKENDORF.